G. McGARRY.
AUTO PLATE AND CRANK HOLDER.
APPLICATION FILED MAY 11, 1921.
1,415,594.
Patented May 9, 1922.
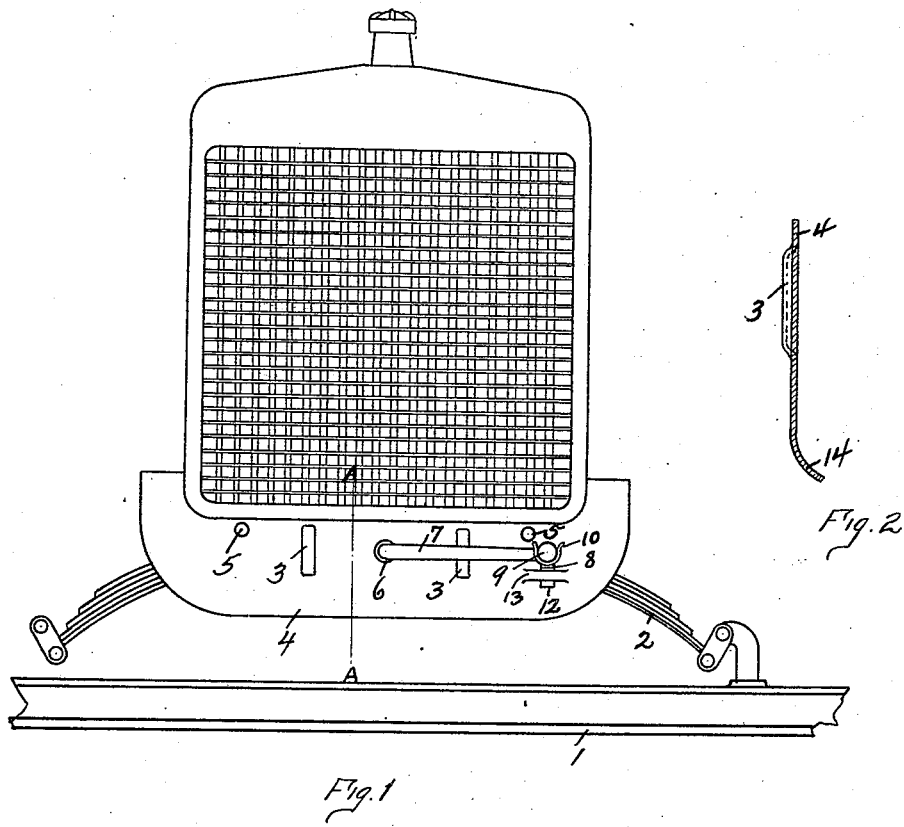
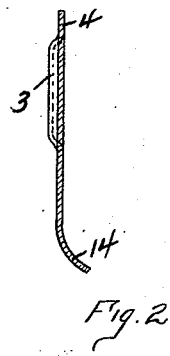
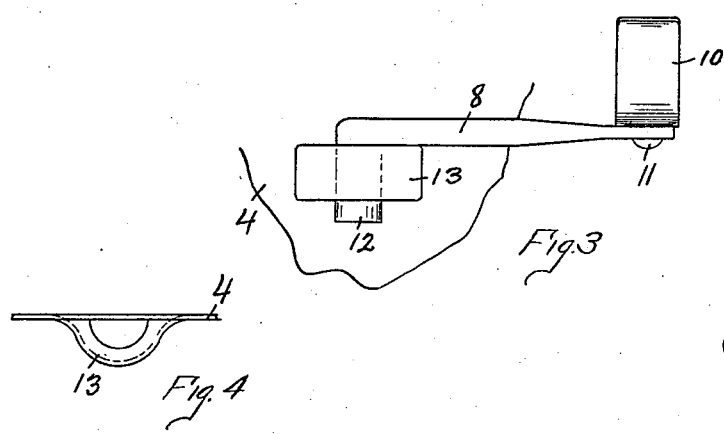

UNITED STATES PATENT OFFICE.

GEORGE McGARRY, OF YOUNGSTOWN, OHIO.

AUTO PLATE AND CRANK HOLDER.

1,415,594. Specification of Letters Patent. Patented May 9, 1922.

Application filed May 11, 1921. Serial No. 468,519.

*To all whom it may concern:*

Be it known that GEORGE McGARRY, citizen of the United States of America, residing at Youngstown, in the county of Mahoning, and State of Ohio, has invented certain new and useful Improvements in Auto Plates and Crank Holders, of which the following is a specification.

This invention relates to an auto plate and crank holder, and has for its object to provide a simple, inexpensive and yet practical device of this character comprising a plate fitting snugly underneath a radiator, and concealing a truss member and parts which are used to support said radiator and connecting parts. This plate is adapted to be readily connected to the vehicle frame, and is especially adapted for use with Ford cars, but capable of attachment to other cars.

A further object of the invention is to provide a plate covering the parts above mentioned, thereby giving a better appearance to the front end of the car, and also making the task of cleaning the car easier by concealing the irregular parts.

A still further object is to provide a holder for the auto crank so as to hold the same in a longitudinal position when not in use, and to provide means for swinging said crank holder horizontally outward so as to be out of the way when the crank is being used.

With these and other objects in view the invention consists of certain novel features of construction as will be more fully described and particularly pointed out in the appended claims.

In the accompanying drawing:

Figure 1 is a front view of the device.

Figure 2 is a detail sectional view taken on line A. A. of Figure 1.

Figure 3 is a detail view showing the crank holder swung out of the way so that the crank may be used.

Figure 4 is a detail view.

By referring to Figure 1 it will be seen I have provided an ordinary axle 1 upon which is secured by ordinary means a spring 2. Resting upon this spring 2 there is usually a truss member secured to said spring by means of clamping members. These clamping members projecting out past the general plane of the said truss member and the spring 2. In order to secure a snug fit against said truss member, spring and clamping means, I have provided a recess for the same made by pressing outwardly rectangular parts 3, (see Figs. 1 and 2) of the plate 4 which is secured to the machine by means of bolts 5. Centrally located in said plate 4 there is an opening 6 through which projects the crank 7. When it is desired to hold the crank 7 in a secure position the hinged arm 8 is swung outwardly at right angles to the plane of the plate 4 and the crank handle 9 pushed downwardly into a clip 10 secured upon the upper side and end of the arm 8 by means of a rivet 11. This arm 8 has a downwardly extending part 12 which is hinged to the plate 4 by means of a strap 13 which is formed by pressing outwardly a slotted portion of the plate 4.

By referring to Figure 2 it will be seen that the plate 4 is provided with an inturned flange 14, thereby giving the plate a more substantial and artistic effect.

What I claim is:

1. In a device of the class described, a plate member secured snugly underneath a radiator, outwardly pressed rectangular parts for housing connecting parts, an inturned flange on said plate, a strap formed by pressing outwardly a portion of the said plate, an arm provided with a downwardly extending part hinged within said strap and plate, a clip secured to the upper and outer end of said arm, substantially as described for the purpose set forth.

2. In a device of the class described, the combination of a plate secured beneath a radiator, said plate covering the parts directly underneath said radiator, a crank holder hinged by means of a strap formed from a part of said plate, a clip secured to the upper and outer end of said crank holder, said crank holder positioned so as to swing horizontally outward when not in use and to take a position at right angles to the plane of the plate when in use, thereby holding the crank in a horizontal position, substantially as described for the purpose set forth.

In testimony whereof I affix my signature.

GEORGE McGARRY.

Witnesses:
MARTHA B. McCARTNEY,
ADELE GREENWALD.